United States Patent
Fassnacht

(10) Patent No.: US 8,776,922 B2
(45) Date of Patent: Jul. 15, 2014

(54) METHOD FOR REDUCING A DRIVING POWER OF A VEHICLE DRIVE

(75) Inventor: Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 12/998,813

(22) PCT Filed: Nov. 17, 2009

(86) PCT No.: PCT/EP2009/065274
§ 371 (c)(1),
(2), (4) Date: Aug. 12, 2011

(87) PCT Pub. No.: WO2010/072469
PCT Pub. Date: Jul. 1, 2010

(65) Prior Publication Data
US 2011/0295451 A1    Dec. 1, 2011

(30) Foreign Application Priority Data
Dec. 16, 2008   (DE) .......................... 10 2008 054 699

(51) Int. Cl.
*B60W 10/04*   (2006.01)

(52) U.S. Cl.
USPC ................. 180/65.29; 180/65.31; 180/65.1; 903/902; 701/70; 701/93

(58) Field of Classification Search
None
See application file for complete search history.

(56) References Cited

U.S. PATENT DOCUMENTS

| | | | |
|---|---|---|---|
| 6,859,693 B2 * | 2/2005 | Tamagawa et al. ............. | 701/22 |
| 7,653,474 B2 * | 1/2010 | Cawthorne et al. ............. | 701/99 |
| 7,747,363 B1 * | 6/2010 | Tang ................................ | 701/22 |
| 7,848,902 B2 * | 12/2010 | Zettel et al. .................... | 702/136 |
| 7,911,167 B2 * | 3/2011 | Takeuchi ....................... | 318/432 |
| 8,010,264 B2 * | 8/2011 | Ogata et al. ..................... | 701/55 |
| 8,224,513 B2 * | 7/2012 | Soliman et al. ................. | 701/22 |
| 2002/0055810 A1 * | 5/2002 | Nakasako et al. ............. | 701/22 |
| 2002/0116100 A1 * | 8/2002 | Shimazaki et al. ............. | 701/22 |
| 2002/0147530 A1 * | 10/2002 | Tamagawa et al. ............. | 701/22 |
| 2005/0038576 A1 * | 2/2005 | Hara et al. ....................... | 701/22 |
| 2008/0255716 A1 * | 10/2008 | Bandai et al. ................... | 701/22 |
| 2009/0042688 A1 * | 2/2009 | Itou et al. .......................... | 477/3 |
| 2009/0288634 A1 * | 11/2009 | Takizawa et al. ............. | 123/349 |
| 2010/0198436 A1 * | 8/2010 | Falkenstein ..................... | 701/22 |
| 2010/0222953 A1 * | 9/2010 | Tang ................................ | 701/22 |
| 2010/0299012 A1 * | 11/2010 | Kozarekar ...................... | 701/22 |
| 2011/0106358 A1 * | 5/2011 | Sawada et al. .................. | 701/22 |
| 2012/0101675 A1 * | 4/2012 | Saito ............................... | 701/22 |
| 2012/0136519 A1 * | 5/2012 | Suzuki ............................ | 701/22 |
| 2012/0303199 A1 * | 11/2012 | Oba et al. ......................... | 701/22 |

FOREIGN PATENT DOCUMENTS

| | | | | |
|---|---|---|---|---|
| DE | 10 2004 040 315 | | 3/2006 | |
| EP | 1 247 687 | | 10/2002 | |
| JP | 11-215888 | | 8/1999 | |
| JP | 2000-32602 | | 1/2000 | |
| JP | 2004-324613 | | 11/2004 | |
| JP | 2004-324613 A | * | 11/2004 | ............ B60K 6/442 |
| JP | 2007-189764 | | 7/2007 | |
| JP | 2007-244072 | | 9/2007 | |

* cited by examiner

*Primary Examiner* — Thomas Tarcza
*Assistant Examiner* — Richard Goldman
(74) *Attorney, Agent, or Firm* — Kenyon & Kenyon LLP

(57) ABSTRACT

A method for reducing a driving power of a vehicle drive includes detecting a temperature difference between a temperature of at least one component of the vehicle drive and a temperature threshold value, detecting an instantaneous driving state of the vehicle drive, establishing whether or not the instantaneous driving state allows for a reduction in the driving power of the vehicle drive, and reducing the driving power of the vehicle drive for lowering the temperature of the at least one component in order to increase the temperature difference if the instantaneous driving state allows for the reduced driving power.

21 Claims, 1 Drawing Sheet

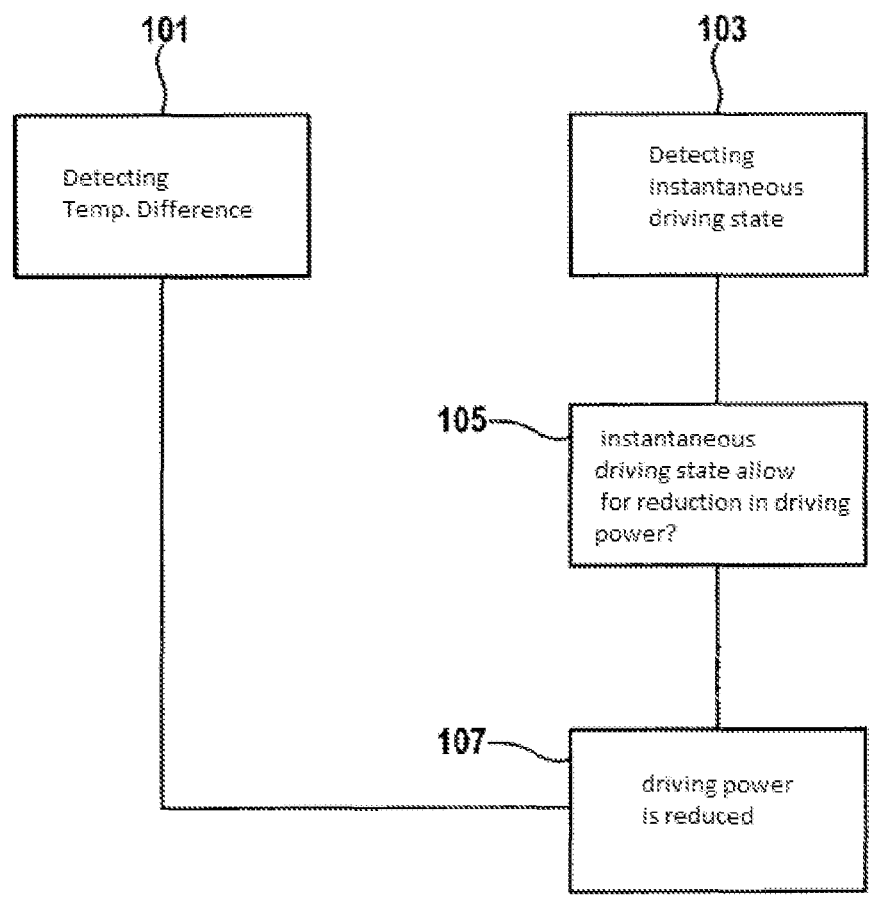

METHOD FOR REDUCING A DRIVING POWER OF A VEHICLE DRIVE

BACKGROUND OF THE INVENTION

1. Field of the Invention

The present invention relates to power reduction in vehicle drives for lowering temperature.

2. Description of Related Art

The performance of components of a vehicle drive is essentially a function of the heat output or of the temperature of the particular component of the vehicle drive. Thus, for example an electric drive or an energy storage of an electric vehicle or of a hybrid vehicle has a temperature curve which results in the particular component having to be operated at reduced power if its temperature reaches a maximum temperature at which this component may be damaged. This power reduction, also known as derating, presents no problem, as long it is not performed in driving situations in which the driver expects or needs the full driving power, for example, to carry out, for example, a passing maneuver on the oncoming lane or to merge onto a superhighway. Power reduction is critical, in particular in sporty driving, which makes providing the full driving power necessary.

An excess temperature power regulation is normally used for power reduction with the purpose of avoiding critical component temperatures; when a critical temperature occurs, such regulation forces a brief shutoff of the vehicle or an operation of the vehicle in a state in which the particular component is cooled off, driving being resumed after a cool-off. If the affected component is a generator which supplies an electric motor with electrical power in a power split hybrid vehicle drive train, for example, when a generator excess temperature is reached, the driving power is abruptly reduced, so that the vehicle is drivable at crawling speed at most. For reducing the driving power, a current reduction, such as described in Japanese patent document 11-215888, may be performed.

In fact, there is the possibility of designing the vehicle drive for a maximum sustained driving power for avoiding the power reduction. This requires overdimensioning of the overall system in order to avoid the infrequent special case of excess temperature power regulation, which is associated with high additional costs. Indeed the driver could be pointed, for example, to a component temperature to be reached or to an imminent power reduction via a display. This presupposes that the driver also sees and heeds this display. The disadvantage here is that, if a display of this type is not heeded, one of the components may be damaged by overload, or dangerous driving situations may arise due to an abrupt power reduction.

BRIEF SUMMARY OF THE INVENTION

The present invention is based on the finding that the driving power may be reduced, while, at the same time, critical driving situations are avoided, as a function of the driving state, in particular in a driving state in which the driving power may be safely reduced. Driving states which are suitable therefor include, for example, in addition to driving at low propulsive power or at a constant or decreasing velocity, in particular braking or recuperation states.

According to one aspect, the present invention relates to a method for reducing a driving power of a vehicle drive, including detecting a temperature difference between a temperature of at least one component of the vehicle drive and a temperature threshold value, detecting an instantaneous driving state of the vehicle drive, establishing whether or not the instantaneous driving state allows a reduction in the driving power of the vehicle drive and reducing the driving power of the vehicle drive for reducing the temperature of the at least one component in order to increase the temperature difference if the instantaneous driving state allows for the reduced driving power. The reduction in the driving power is thus advantageously shifted to driving states which are not critical with regard to safety at reduced driving power.

According to one specific embodiment, the driving power is not reduced if the instantaneous driving state does not allow for a reduction in the driving power. It is thus advantageously ensured that the driving (power) reduction is performed only in driving states provided for this purpose.

According to one specific embodiment, the instantaneous driving state allows for a reduction in the driving power if (the state) is a constant or braked driving state or a recuperation state or an accelerated state at an acceleration value below an acceleration threshold value. The acceleration threshold value may amount to 0.5 m/s$^2$ or 1 m/s$^2$ for example. In contrast, the instantaneous driving state does not allow for a reduction in the driving power if the driving state is a passing driving state or an accelerated driving state at an acceleration value greater than the above-mentioned acceleration value. The driving states that are advantageous for driving power reduction may thus be detected in a simple and reliable manner.

According to one specific embodiment, the driving power is furthermore reduced only if a predetermined or an expected or subsequent driving state is associated with an increase in temperature of the component, which is not less, i.e., is equal to or higher than, the temperature difference. This advantageously ensures that the reduction in the driving power is performed only if it is also necessary.

According to one specific embodiment, the predetermined or expected driving state is an accelerated driving state or a passing driving state in which the power reduction is advantageously not performed.

According to one specific embodiment, the expected driving state is detected, for example, via an accelerator pedal position or a torque request or an acceleration request by the driver or an acceleration measurement. It may thus be advantageously ensured that sufficient power reserves are available for the subsequent critical driving state.

According to one specific embodiment, in the step of determining whether or not the instantaneous driving state allows for a reduction in the driving power, this driving state is compared with at least one reference driving state from, for example, a plurality of reference driving states. The reference driving states may be advantageously stored in an electronic memory or in a lookup table and indicate whether the particular driving state is suitable or unsuitable for performing a power reduction.

According to one specific embodiment, the component is an electric motor or an internal combustion engine or an energy storage or a transmission or an inverter or a pulse-controlled inverter or a subcomponent of the above-mentioned components. Furthermore, a temperature sensor may be used for detecting the temperature of the particular component.

According to one specific embodiment, a number of temperature differences between one particular temperature of a particular component of the number of components of the vehicle drive and a temperature threshold value associated with the particular component are detected. The driving power of the vehicle drive is then reduced if a temperature difference detected with respect to at least one of the components is too small for operating the vehicle drive in a predetermined or expected driving state. This advantageously ensures that sufficient power reserves are available for the predetermined or expected subsequent driving state. The temperature threshold values are preferably component-specific and may be identical or different, whereby it is taken into account that different critical temperatures may be associated with the particular components which, for example, may be in a range between 60° C. and 200° C.

According to one specific embodiment, the temperature threshold value is a maximum temperature allowed for the operation of the component and may be in the above-mentioned temperature range, for example.

According to one specific embodiment, the temperature difference is fixed or driving state-dependent. The temperature difference may preferably be determined on the basis of the formula $$\Delta T = [(P_{maxacceleration} - P_{cool}) \cdot t_{pass}]/C_{component}$$

where $P_{maxacceleration}$ is a maximum acceleration power loss, $P_{cool}$ is an instantaneous cooling power or a predicted cooling power, which may be ascertained, for example taking into account an ambient temperature, $t_{pass}$ is the maximum duration of a passing operation, for example, 20 s or 40 s, and $C_{component}$ is a component thermal capacity.

According to one specific embodiment, the allowability of the power reduction is established by analyzing navigation data, so that dangerous driving on an oncoming lane may also be advantageously detected.

According to one aspect, the present invention relates to a software-driven device, for example, a control unit, which is designed for executing a computer program in order to perform the method according to the present invention.

According to a further aspect, the present invention relates to a computer program having a program code for performing the method according to the present invention if the computer program runs or is executed on a computer.

BRIEF DESCRIPTION OF THE DRAWINGS

FIG. 1 shows a schematic sequence of the method according to the present invention for reducing a driving power.

DETAILED DESCRIPTION OF THE INVENTION

As FIG. 1 shows, a temperature difference between a temperature of at least one component of the vehicle drive and a temperature threshold value is detected in step 101. At the same time or previously or subsequently, an instantaneous driving state of the vehicle drive, i.e., the driving state in which the vehicle drive is at the moment, is detected in step 103. In step 105, it is established, for example, on the basis of one comparison or multiple comparisons, whether or not the instantaneous driving state allows for a reduction in the driving power. Subsequently, in step 107, the driving power of the vehicle drive is reduced for lowering the temperature of the at least one component in order to increase the temperature difference for providing a temperature reserve, for example, for a subsequent driving state if the instantaneous driving state allows for a reduced driving power. In other words, the driving power is reduced only if it has been established that the instantaneous driving state allows for the reduction in the driving power.

A thermal reserve, for example, for subsequent driving states, for example passing maneuvers or accelerations, is thus provided, while at the same time it is ensured by detecting a driving state unsuitable for the driving power reduction, for example, an acceleration or a passing operation, that the reduction in the driving power, for example in the maximum allowable driving power, is initiated only in driving situations which make a safe reduction in the driving power possible. This is the case, for example, in particular in the case of recuperation, at a constant velocity, or at a slight acceleration. The power limitation is preferably maintained only until, for example, a lower limiting temperature threshold value has been reached taking into account an exemplary temperature hysteresis.

The thermal reserve ensures that, for example, during a strong acceleration operation once initiated, the driving power does not have to be reduced, so that the acceleration operation may be safely performed. This means that the system is to be designed, for example, that the power is reduced in advance, for example, in the case of a recuperation or a slight acceleration at an acceleration value below the above-mentioned acceleration value. At the same time, an indication may be output, which shows, for example, that the instantaneous temperature difference between the instantaneous temperature of the particular component and a maximum possible temperature of the particular component contains a safety reserve which allows for an acceleration operation. The shutoff temperature outside critical driving maneuvers is thus preferably equal to the maximum possible temperature minus the temperature difference. The temperature difference may be ascertained separately for each relevant component on the basis of the formula $$\Delta T = [(P_{maxacceleration} - P_{cool}) \cdot t_{pass}]/C_{component},$$

where $P_{maxacceleration}$ is a maximum acceleration power loss, $P_{cool}$ is an instantaneous cooling power or a predicted cooling power, which may be ascertained, for example, taking into account an ambient temperature, $t_{pass}$ is the maximum duration of a passing operation, for example, 20 s or 40 s, and $C_{component}$ is a thermal capacity of the particular relevant component.

The duration $t_{pass}$ may be estimated, for example, as follows: Based on the assumption that an acceleration operation from 0 km/h to 100 km/h for an unloaded vehicle takes less than 20 s, it may be assumed that the same acceleration operation for a loaded vehicle takes 30 s, for example. This means that for a given vehicle, for example on average, all expected acceleration operations may take approximately 30 s maximum. In addition, it may be assumed that in passing or entry operations on superhighways, for example, minor changes in velocity are usually made, so that the duration of the expected acceleration operations is always shorter.

The thermal reserve is preferably ascertained for each vehicle or each component individually, since it should be preferably as low as possible, for example, in order to optimize the thermal utilization of the drive components. At the same time, the thermal reserves should be large enough so that a dangerous acceleration operation may be safely terminated.

Furthermore, a signal may be set, for example with the aid of a vehicle controller, which shows that a power reduction is possible, i.e., no critical acceleration operation is occurring, and, for example, each component performs a component-related power reduction, for example, a shutoff when reaching the particular maximum temperature, for example, minus the above-mentioned temperature difference. This component then sets an excess temperature flag, for example, which indicates that an excess temperature has been reached.

To avoid driving state situations in which the driver, for example, slowly approaches an intersection and, at the same time, a power limitation indicates, via a set signal, for example, the possibility of power reduction immediately before the driver wishes to accelerate, the full driving power may be made available once again, for example, by quickly operating the accelerator pedal, for example, by totally depressing the accelerator pedal, despite the set indication display, until the maximum allowable temperature is reached or if the acceleration is reduced again.

The driving power may be substantially reduced for cooling the particular component, whereby the vehicle is operated at crawling speed or at a standstill, for example. In addition, a decision may be made, depending on the driving state or the situation, whether the driving power is reduced in such a way that the particular component is cooled off, or whether the driving power is reduced only to a degree such that further increase in temperature of the particular component is prevented, whereby more driving power may be made available. This is advantageous in particular when driving through tunnels or on roads without a shoulder. Driving situations of this type may be ascertained, for example, with the aid of a navigation system which knows the particular road condition and prevented with the aid of a vehicle controller. If the vehicle is on a road of this type, the driving power may preferably be reduced only to a degree such that the temperature of the particular component does not rise. At the same time, an indication display may be set which informs the driver of the existing situation. However, in this case, it should preferably be ensured that at least slowed-down driving is possible in order to leave the danger zone. In particular, dangerous situations such as, for example, getting stuck on a railroad crossing, may be avoided.

The concept according to the present invention may be implemented, for example, as part of control software for an inverter, a battery, or also within a central vehicle controller. The strategy according to the present invention for heat-related power limitation may be carried out for each vehicle, for example on the basis of driving tests in which the particular vehicle is operated in such a way that thermal power limitation occurs.

What is claimed is:

1. A method for reducing a driving power of a vehicle drive, comprising:
   detecting a temperature difference between a temperature of at least one component of the vehicle drive and a predetermined temperature threshold value;
   detecting an instantaneous driving state of the vehicle drive;
   determining whether the instantaneous driving state allows for a reduction in the driving power; and
   reducing the driving power of the vehicle drive for lowering the temperature of the at least one component, in order to increase the temperature difference if the instantaneous driving state allows for the reduction in the driving power,
   wherein for determining whether the instantaneous driving state allows for the reduction in the driving power, the instantaneous driving state is compared with at least one reference driving state from a plurality of reference driving states,
   wherein at least one of:
   (i) the plurality of reference driving states includes at least two of a constant driving state, a braked driving state, a recuperation state, and an accelerated driving state at an acceleration below a predefined acceleration threshold value; and
   (ii) the plurality of reference driving states are stored in one of an electronic memory and a lookup table, and wherein the electronic memory and lookup table include an indication whether a particular driving state of the reference driving states is suitable or unsuitable for performing the power reduction.

2. The method as recited in claim 1, wherein the component is one of an electric motor, an internal combustion engine, an energy storage, a transmission, an inverter, or a pulse-controlled inverter.

3. The method as recited in claim 1, wherein the driving power is not reduced if the instantaneous driving state does not allow for a reduction in the driving power.

4. The method as recited in claim 3, wherein the instantaneous driving state allows for a reduction in the driving power if the state is one of a constant driving state, a braked driving state, a recuperation state, an accelerated driving state at an acceleration below a predefined acceleration threshold value, and wherein the driving state does not allow for a reduction in the driving power if the driving state is one of an accelerated driving state at an acceleration greater than the predefined acceleration threshold value, or a passing driving state.

5. The method as recited in claim 3, wherein the driving power is reduced only if one of a predetermined driving state or an expected driving state is associated with an increase in temperature of the component one of equal to or greater than the temperature difference.

6. The method as recited in claim 5, wherein the one of the predetermined driving state or the expected driving state is one of the accelerated driving state or the passing driving state.

7. The method as recited in claim 6, wherein the expected driving state is detected by one of an accelerator pedal position, a torque request, or an acceleration request.

8. The method as recited in claim 7, wherein the component is one of an electric motor, an internal combustion engine, an energy storage, a transmission, an inverter, or a pulse-controlled inverter.

9. The method as recited in claim 5, wherein for each one of multiple components of the vehicle drive, a temperature difference between a temperature of a particular component and a predefined temperature threshold value associated with the particular component is detected, and the driving power of the vehicle drive is reduced if at least one detected temperature difference is small for operating the vehicle drive in the one of the predetermined driving state or the expected driving state.

10. The method as recited in claim 9, wherein the predefined temperature threshold value associated with the particular component is a maximum allowable temperature for operating the particular component.

11. The method as recited in claim 4, wherein the temperature difference is at least one of (i) fixed, (ii) driving state-dependent, and (iii) ascertained on the basis of the following formula:

$$\Delta T = [(P_{maxacceleration} - P_{cool}) \cdot t_{pass}]/C_{component}$$

where $P_{maxacceleration}$ is a maximum acceleration power loss, $P_{cool}$ is one of an instantaneous cooling power or a predicted cooling power which may be ascertained taking into account an ambient temperature, $t_{pass}$ is a maximum duration of a passing operation, and $C_{component}$ is a component thermal capacity.

12. The method as recited in claim 3, wherein the driving power is reduced only if the temperature difference for operating the vehicle drive in one of a predetermined driving state or an expected driving state within a predetermined interval is small.

13. The method as recited in claim 5, wherein the allowability of the power reduction is established via analysis of navigation data.

14. The method as recited in claim 1, wherein the plurality of reference driving states includes at least two of a constant driving state, a braked driving state, a recuperation state, and an accelerated driving state at an acceleration below a predefined acceleration threshold value.

15. The method as recited in claim 1, wherein the plurality of reference driving states are stored in one of an electronic memory and a lookup table, and wherein the electronic memory and lookup table include an indication whether a particular driving state of the reference driving states is suitable or unsuitable for performing the power reduction.

16. A control unit for reducing a driving power of a vehicle drive, comprising:
  a means for detecting a temperature difference between a temperature of at least one component of the vehicle drive and a predetermined temperature threshold value;
  a means for detecting an instantaneous driving state of the vehicle drive;
  a means for determining whether the instantaneous driving state allows for a reduction in the driving power; and
  a means for reducing the driving power of the vehicle drive for lowering the temperature of the at least one component, in order to increase the temperature difference if the instantaneous driving state allows for the reduction in the driving power,
  wherein for determining whether the instantaneous driving state allows for the reduction in the driving power, the instantaneous driving state is compared with at least one reference driving state from a plurality of reference driving states,
  wherein at least one of:
    (i) the plurality of reference driving states includes at least two of a constant driving state, a braked driving state, a recuperation state, and an accelerated driving state at an acceleration below a predefined acceleration threshold value; and
    (ii) the plurality of reference driving states are stored in one of an electronic memory and a lookup table, and wherein the electronic memory and lookup table include an indication whether a particular driving state of the reference driving states is suitable or unsuitable for performing the power reduction.

17. The method as recited in claim 16, wherein the plurality of reference driving states includes at least two of a constant driving state, a braked driving state, a recuperation state, and an accelerated driving state at an acceleration below a predefined acceleration threshold value.

18. The method as recited in claim 16, wherein the plurality of reference driving states includes at least two of a constant driving state, a braked driving state, a recuperation state, and an accelerated driving state at an acceleration below a predefined acceleration threshold value.

19. A non-transitory computer-readable data storage medium storing a computer program having program codes which, when executed on a computer, performs a method for reducing a driving power of a vehicle drive, the method comprising:
  detecting a temperature difference between a temperature of at least one component of the vehicle drive and a predetermined temperature threshold value;
  detecting an instantaneous driving state of the vehicle drive;
  determining whether the instantaneous driving state allows for a reduction in the driving power; and
  reducing the driving power of the vehicle drive for lowering the temperature of the at least one component, in order to increase the temperature difference if the instantaneous driving state allows for the reduction in the driving power,
  wherein for determining whether the instantaneous driving state allows for the reduction in the driving power, the instantaneous driving state is compared with at least one reference driving state from a plurality of reference driving states,
  wherein at least one of:
    (i) the plurality of reference driving states includes at least two of a constant driving state, a braked driving state, a recuperation state, and an accelerated driving state at an acceleration below a predefined acceleration threshold value; and
    (ii) the plurality of reference driving states are stored in one of an electronic memory and a lookup table, and wherein the electronic memory and lookup table include an indication whether a particular driving state of the reference driving states is suitable or unsuitable for performing the power reduction.

20. The method as recited in claim 19, wherein the plurality of reference driving states are stored in one of an electronic memory and a lookup table, and wherein the electronic memory and lookup table include an indication whether a particular driving state of the reference driving states is suitable or unsuitable for performing the power reduction.

21. The method as recited in claim 19, wherein the plurality of reference driving states are stored in one of an electronic memory and a lookup table, and wherein the electronic memory and lookup table include an indication whether a particular driving state of the reference driving states is suitable or unsuitable for performing the power reduction.

* * * * *